US012699366B2

(12) United States Patent
Nakane et al.

(10) Patent No.: US 12,699,366 B2
(45) Date of Patent: Aug. 4, 2026

(54) TRANSFER LEARNING DEVICE AND TRANSFER LEARNING METHOD

(71) Applicant: MITSUBISHI ELECTRIC CORPORATION, Tokyo (JP)

(72) Inventors: Koki Nakane, Tokyo (JP); Go Sato, Tokyo (JP); Jun Maruta, Tokyo (JP); Hideyuki Masui, Tokyo (JP); Shinya Nishino, Tokyo (JP); Takeyuki Kawata, Tokyo (JP); Masaya Kimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 371 days.

(21) Appl. No.: 18/380,742

(22) Filed: Oct. 17, 2023

(65) Prior Publication Data

US 2024/0045387 A1 Feb. 8, 2024

Related U.S. Application Data

(63) Continuation of application No. PCT/JP2021/024903, filed on Jul. 1, 2021.

(51) Int. Cl.
*G05B 13/02* (2006.01)

(52) U.S. Cl.
CPC .................................. *G05B 13/027* (2013.01)

(58) Field of Classification Search
CPC ... G05B 13/027; G05B 13/04; G05B 19/4155
See application file for complete search history.

(56) References Cited

U.S. PATENT DOCUMENTS 11,375,019 B2 6/2022 Kawaai et al.
2016/0224892 A1 8/2016 Sawada et al.
(Continued)

FOREIGN PATENT DOCUMENTS

CN 110503204 A 11/2019
JP 2019-144872 A 8/2019
(Continued)

OTHER PUBLICATIONS

International Search Report (PCT/ISA/210) issued in PCT/JP2021/024903 mailed on Sep. 21, 2021.
(Continued)

*Primary Examiner* — Mong-Shune Chung
(74) *Attorney, Agent, or Firm* — Birch, Stewart, Kolasch & Birch, LLP

(57) ABSTRACT

Included are: a machining data acquiring unit to acquire machining data including data related to time-series machining conditions to perform machining for a plurality of steps and data related to a machining state for the plurality of steps on a basis of the machining conditions; an analysis unit to calculate an importance with respect to machining data; an extraction unit to extract transfer learning data for performing transfer learning of a first machine learning model on a basis of the importance; and a learning unit to perform the transfer learning of the first machine learning model by using the transfer learning data, and generate a second machine learning model that receives, as an input, data related to the machining conditions in time series for the plurality of steps and outputs data related to a machining state after execution for the plurality of steps.

7 Claims, 5 Drawing Sheets

(56)                          References Cited

U.S. PATENT DOCUMENTS

| | | | | |
|---|---|---|---|---|
| 2018/0356793 A1* | 12/2018 | Kanemaru | ............... | G06N 3/08 |
| 2019/0351512 A1* | 11/2019 | Izumi | ................... | G05B 13/027 |
| 2019/0354850 A1 | 11/2019 | Watson et al. | | |
| 2019/0354892 A1 | 11/2019 | Hagihara et al. | | |
| 2020/0014761 A1* | 1/2020 | Kawaai | ................... | H04L 67/34 |
| 2020/0279158 A1* | 9/2020 | Tsunoda | ............... | G06N 3/0442 |
| 2020/0326670 A1* | 10/2020 | Tsuneki | ............. | G05B 13/0265 |
| 2022/0121183 A1* | 4/2022 | Kuhn | ................... | G06N 3/0499 |
| 2022/0286512 A1 | 9/2022 | Kawaai et al. | | |

FOREIGN PATENT DOCUMENTS

| | | | |
|---|---|---|---|
| JP | 2019-198928 A | 11/2019 | |
| JP | 6720402 B2 | 7/2020 | |
| KR | 10-2020-0068534 A | 6/2020 | |
| WO | WO 2018/173121 A1 | 9/2018 | |

OTHER PUBLICATIONS

Taiwan Office Action for application No. 110145008 mailed May 18, 2023.

Chinese Office Action and Search Report for Chinese Application No. 202180097752.2, dated Mar. 20, 2026, with English translation of the Office Action.

\* cited by examiner

FIG. 1

START

Acquire Machining Data — ST1

Acquire
Preliminary Learning Data — ST2

Calculate Importance of
Machining Data — ST3

Extract
Transfer Learning Data from
Machining Data — ST4

Generate
Second Machine
Learning Model from
Transfer Learning Data — ST5

END

ST2 of Fig. 4

Compress Data — ST31

Calculate Importance on
Basis of Compressed Data — ST32

ST4 of Fig. 4

TRANSFER LEARNING DEVICE AND TRANSFER LEARNING METHOD

CROSS REFERENCE TO RELATED APPLICATIONS

This application is a Continuation of PCT International Application No. PCT/JP2021/024903, filed on Jul. 1, 2021, which is hereby expressly incorporated by reference into the present application.

TECHNICAL FIELD

The present disclosure relates to a transfer learning device and a transfer learning method for generating a learned model (hereinafter, referred to as a "machine learning model") for supporting setting of a machining condition when causing a machining machine to execute machining.

BACKGROUND ART

When machining a workpiece to be processed, the machining machine follows machining conditions for performing machining in each process of machining. The machining condition includes, for example, a value instructing a position or speed of machining. The machining conditions are instructed by a user of the machining machine or set according to a program by a control device that controls the machining machine, for example. However, in a machining machine, machining may not proceed according to set machining conditions due to disturbance such as friction, temperature, or vibration during machining. Therefore, conventionally, there is known a technique for enabling setting of a machining condition suitable for a machining machine to obtain a machining result as instructed by using a machine learning model that uses data related to the machining condition as an input and outputs data related to a machining state executed by the machining machine on the basis of the machining condition.

Meanwhile, a technique of so-called transfer learning in which a machine learning model is applied to learning of another field is known. For example, Patent Literature 1 discloses a technique of performing additional learning of a shared model using sample data collected from a device in a server device that selects and supplies an optimal shared model to various devices having different environments, conditions, or the like. Although learning is performed in advance, the shared model is in a situation in which learning is not performed in an environment and conditions specialized for the device, and thus the server device performs additional learning to finely adjust the shared model in order to perform determination, classification, and the like with high accuracy. The server device obtains an effect of an action called transfer learning by performing additional learning on the basis of the shared model.

CITATION LIST

Patent Literature

Patent Literature 1: WO 2018/173121

SUMMARY OF INVENTION

Technical Problem

The characteristics of the machining machine change in accordance with the situation of the machining machine, such as a secular change, a change in a workpiece, or an environment of a site where the machining machine operates. With this change, a machine learning model for setting a machining condition suitable for the machining machine to obtain a machining result as instructed needs to be a machine learning model suitable for a current situation in which the machining machine operates.

However, if the user performs learning from zero according to the current situation of the machining machine and generates a new machine learning model, it takes time.

Therefore, for example, as in the technique disclosed in Patent Literature 1 described above, it is conceivable to generate a machine learning model (hereinafter, referred to as a "second machine learning model") suitable for the current situation in which the machining machine operates on the basis of a machine learning model (hereinafter, referred to as a "first machine learning model") prepared in advance using a so-called transfer learning technique.

Here, for example, data obtained by operating the machining machine under the current situation needs to be collected as data (hereinafter, referred to as "transfer learning data") for generating the second machine learning model. The data is obtained from, for example, a control device that controls the machining machine. The control device samples a time-series machining condition and a machining state in a process in which the machining machine performs machining at a preset period. However, in general, the sampling period of the control device is short such as 1 ms. In addition, the data collected by the control device may include data indicating various machining conditions for coping with various machining contents performed on various workpieces. That is, the amount of data collected from the control device by operating the machining machine becomes enormous.

Therefore, even if a so-called transfer learning technique is used, it takes time to generate the second machine learning model because the amount of data collected by operating the machining machine is enormous.

As described above, there is a problem that it takes a lot of time to generate the second machine learning model for setting the machining condition suitable for the situation of the machining machine at the site where the machining machine actually operates using all the data collected at the machining site.

The present disclosure has been made to solve the above problems, and an object thereof is to provide a transfer learning device capable of generating a second machine learning model for setting a machining condition suitable for a situation of a machining machine at a site where the machining machine actually operates from a part of data without requiring all of the data collected at the site of machining.

Solution to Problem

A transfer learning device according to the present disclosure includes: processing circuitry performing: to acquire a plurality of pieces of machining data including data related to time-series machining conditions for causing a machining machine to perform machining for a plurality of steps and data related to a machining state executed by the machining machine for the plurality of steps on a basis of the machining conditions; to calculate an importance with respect to each piece of machining data acquired on a basis of a plurality of pieces of the machining data acquired; to extract a plurality of pieces of transfer learning data for performing transfer learning of a first machine learning model that receives, as an input, the data related to the machining conditions in time series for the plurality of steps generated in advance from among a plurality of pieces of the machining data acquired on a basis of the importance calculated and outputs data related to a machining state after execution for the plurality of steps; and to perform the transfer learning of the first machine learning model by using a plurality of pieces of the transfer learning data extracted, and generate a second machine learning model that receives, as an input, data related to the machining conditions in time series for the plurality of steps and outputs data related to a machining state after execution for the plurality of steps.

Advantageous Effects of Invention

According to the present disclosure, with the above configuration, it is possible to generate the second machine learning model for setting the machining condition suitable for the situation of the machining machine at the actual operation site from a part of the data without requiring all of the data collected at the machining site. As a result, the second machine learning model can be generated without requiring much time.

BRIEF DESCRIPTION OF DRAWINGS

FIG. 1 is a diagram illustrating a configuration example of a transfer learning device according to a first embodiment.

DESCRIPTION OF EMBODIMENTS

Hereinafter, an embodiment of the present disclosure will be described in detail with reference to the drawings.

First Embodiment

Figure 1:
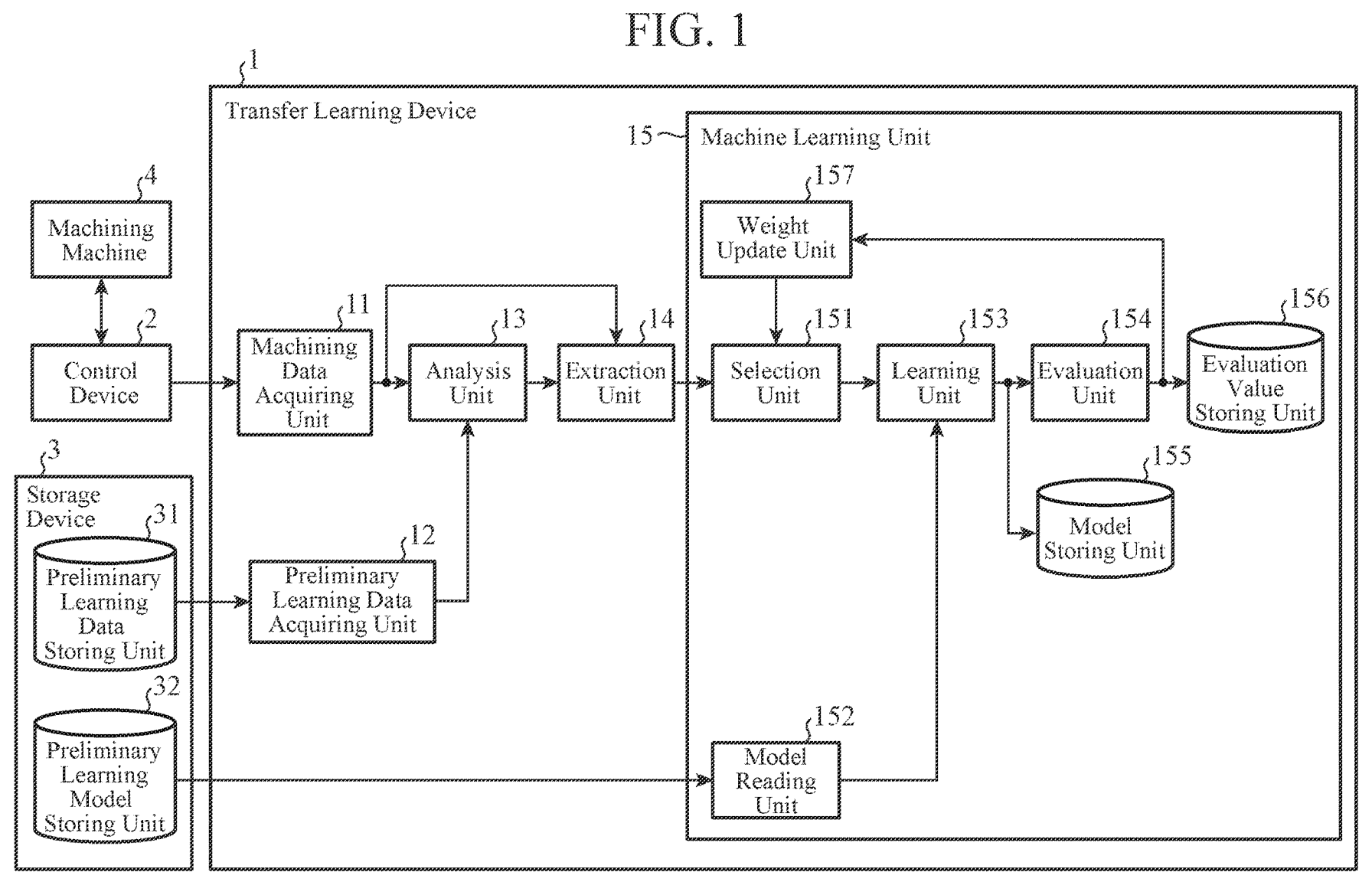

FIG. 1 is a diagram illustrating a configuration example of a transfer learning device 1 according to a first embodiment.

Figure 2:
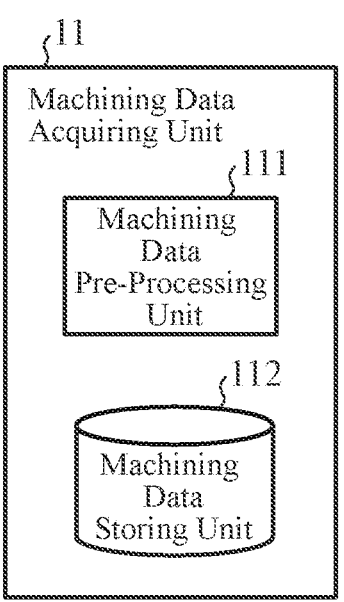
FIG. 2 is a diagram illustrating a detailed configuration example of a machining data acquiring unit in the transfer learning device according to the first embodiment.

FIG. 2 is a diagram illustrating a detailed configuration example of a machining data acquiring unit 11 in the transfer learning device 1 according to the first embodiment.

Figure 3:
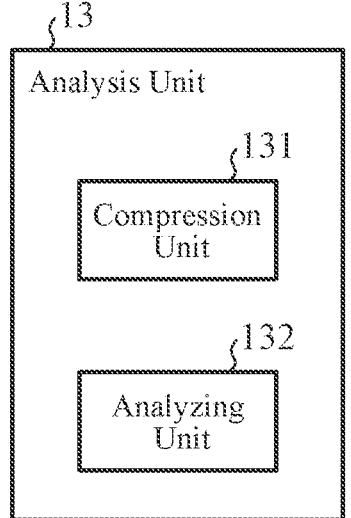
FIG. 3 is a diagram illustrating a detailed configuration example of an analysis unit in the transfer learning device according to the first embodiment.

FIG. 3 is a diagram illustrating a detailed configuration example of an analysis unit 13 in the transfer learning device 1 according to the first embodiment.

The transfer learning device 1 according to the first embodiment generates a learned model (hereinafter, referred to as a "machine learning model") for setting a machining condition when causing a machining machine 4 to execute machining.

The machining machine 4 is an industrial device that performs machining according to machining conditions. In the first embodiment, the machining machine 4 is assumed to be, for example, a numerical control (NC) machining machine. Note that this is merely an example, and it is sufficient that the machining machine 4 is a machining machine driven by a motor.

For example, the machining machine 4 cuts or polishes an object to be processed (hereinafter, referred to as a "workpiece") made of metal, or removes an unnecessary portion using energy such as electricity to make the workpiece have a desired shape. Note that the workpiece is not limited to metal.

Examples of the machining machine 4 include a laser machining machine, an electrical discharge machining machine, a cutting machining machine, a polishing machining machine, an electrolytic machining machine, an ultrasonic machining machine, and an electron beam machining machine.

The machining conditions are configured by a combination of a plurality of control parameters used to control the machining machine 4. In the machining conditions, for example, a numerical value indicating a command position, a command speed, a command acceleration, a feedback position, a feedback speed, a feedback acceleration, or current feedback is set as a plurality of control parameters. In the machining conditions, a type of the workpiece or a numerical value indicating the content of machining on the workpiece may be set.

Note that a control device 2 is connected to the machining machine 4 and controls the machining machine 4 to process a workpiece according to the machining conditions.

In the first embodiment, it is assumed that the machining conditions are set by the control device 2 based on the process of machining, in other words, each step of machining.

For example, the user at the site operates an input device (not illustrated) included in the control device 2 to input a type of workpiece to be processed by the machining machine 4 and an instruction of the machining content.

For example, the control device 2 stores a program in which it is set what kind of machining step is performed when a certain content of machining is performed on a certain workpiece. When an instruction of a type of a workpiece to be processed by the machining machine 4 and a machining content is input from the user, the control device 2 sets a machining condition in each step of machining according to the stored program, and causes the machining machine 4 to execute each step of machining according to the set machining condition.

The control device 2 controls the machining machine 4, and samples data related to machining conditions set by the control device 2 and data related to a machining state in a process in which the machining machine 4 performs machining at a machining site with a preset period (hereinafter, referred to as a "sampling period"). The machining state refers to a state of a result of machining a workpiece, and is, for example, an error of a machining result obtained by actually operating the machining machine 4 with respect to a machining result in such a manner as the machining machine 4 is instructed. In the first embodiment, the machining state is assumed to be a position error of the machining position actually executed by the machining machine 4 with respect to the position at which the machining machine 4 is instructed to perform machining.

The machining machine 4 performs machining for a plurality of steps in a sampling period.

In the process of causing the machining machine 4 to execute machining, the control device 2 collects, with a sampling period, data related to machining conditions for a plurality of steps and data related to a machining state performed for the plurality of steps. Hereinafter, the data related to the machining conditions and the data related to the machining state collected by the control device 2 from the machining machine 4 at the site are referred to as "machining data".

The data related to the machining condition included in certain machining data includes time-series data of control parameters for a plurality of steps executed in the sampling period. That is, the data related to the machining condition included in certain machining data includes time-series data indicating the command position, time-series data indicating the command speed, time-series data indicating the command acceleration, or the like for a plurality of steps.

In addition, for the data related to the machining state performed for a plurality of steps included in the machining data, the machining state is a state of a result of machining a workpiece at a time point several steps after machining for the plurality of steps is performed. Specifically, certain machining data includes data related to machining conditions for n steps up to certain time t and data related to a machining state at time t+k.

Note that, in general, the sampling period of the control device 2 is about 1 ms.

The transfer learning device 1 acquires a plurality of pieces of machining data from the control device 2. The transfer learning device 1 generates a machine learning model for setting a machining condition suitable for a situation of a site where the machining machine 4 operates, such as a secular change, a change of a workpiece, or an environment of the site where the machining machine 4 operates, on the basis of a plurality of pieces of machining data acquired from the control device 2.

Specifically, the transfer learning device 1 uses a plurality of pieces of machining data to perform transfer learning based on a machine learning model prepared in advance at the time of factory shipment of the machining machine 4 or the like, thereby generating a machine learning model for setting a machining condition suitable for the situation of the site where the machining machine 4 operates.

In the first embodiment, a machine learning model prepared in advance at the time of factory shipment of the machining machine 4 or the like is referred to as a "first machine learning model", and a machine learning model generated by the transfer learning device 1 on the basis of the first machine learning model is referred to as a "second machine learning model". In the first embodiment, it is assumed that the first machine learning model and the second machine learning model are configured by a neural network.

The first machine learning model receives, as an input, data related to time-series machining conditions for a plurality of steps, and outputs data related to a machining state after execution for the plurality of steps.

The first machine learning model is generated by learning using, for example, a plurality of pieces of machining data obtained by causing the machining machine 4 before shipment to execute basic machining on an assumed basic workpiece as learning data (hereinafter, referred to as "preliminary learning data").

For example, a manufacturer or the like of the machining machine 4 operates an input device included in the control device 2 to input an instruction of a type of a workpiece to be subjected to basic machining by the machining machine

4 and basic machining contents. When an instruction of a type of a workpiece to be subjected to basic machining by the machining machine 4 and basic machining content is input from a manufacturer or the like, the control device 2 sets machining conditions in each step of machining, and causes the machining machine 4 to execute each step of machining according to the set machining conditions. The control device 2 causes the machining machine 4 to execute each step, thereby obtaining a plurality of pieces of preliminary learning data. Note that the data related to the machining state included in the preliminary learning data is a teacher label. The generated first machine learning model is shipped together with the machining machine 4 and the control device 2.

In the machining machine 4, machining may not proceed as instructed in the machining conditions due to disturbance such as friction, temperature, or vibration during machining. On the other hand, since the first machine learning model is prepared in advance, the control device 2 can estimate a position error that occurs when the machining machine 4 is operated under the set machining condition on the basis of, for example, the first machine learning model and the data related to the machining condition. Then, the control device 2 can correct the machining condition in consideration of the estimated position error. In addition, for example, information regarding the position error estimated by the control device 2 is provided to the user, and the user can correct the program stored in the control device 2 or correct the machining condition in consideration of the estimated position error.

However, the characteristics of the machining machine 4 change according to the actual situation of the machining machine 4 at the site where the machining machine 4 is used. Therefore, even if the first machine learning model is prepared, the first machine learning model is not suitable for the site, and the machining machine 4, more specifically, the control device 2 that controls the machining machine 4 may not perform machining intended by the user. This is because data related to unlearned machining conditions can be input to the first machine learning model.

Therefore, the transfer learning device 1 according to the first embodiment performs transfer learning on the basis of the first machine learning model, and generates a second machine learning model for setting a machining condition suitable for the situation of the site where the machining machine 4 operates. The transfer learning device 1 according to the first embodiment can efficiently generate the second machine learning model without requiring a large amount of time. Details will be described below.

The transfer learning device 1 according to the first embodiment is connected to the control device 2 and the storage device 3.

As described above, the control device 2 controls the machining machine 4 and collects data related to the machining state in the process in which the machining machine 4 performs machining with the sampling period.

The storage device 3 includes a preliminary learning data storing unit 31 and a preliminary learning model storing unit 32.

The preliminary learning data storing unit 31 stores a plurality of pieces of preliminary learning data used at the time of generating the first machine learning model. The preliminary learning model storing unit 32 stores the first machine learning model.

Note that the storage device 3 may be provided in the machining machine 4 or the control device 2. In addition, the control device 2 may be provided in the machining machine 4.

The transfer learning device 1 generates the second machine learning model by performing transfer learning of the first machine learning model on the basis of the plurality of pieces of machining data acquired from the control device 2 and the first machine learning model stored in the storage device 3. As described above, the machining data that the transfer learning device 1 acquires from the control device 2 includes the data related to the machining condition including the time-series data of each control parameter for a plurality of steps that the control device 2 causes the machining machine 4 to execute, and the data related to the machining state.

The transfer learning device 1 includes a machining data acquiring unit 11, a preliminary learning data acquiring unit 12, an analysis unit 13, an extraction unit 14, and a machine learning unit 15.

The machining data acquiring unit 11 includes a machining data pre-processing unit 111 and a machining data storing unit 112.

The analysis unit 13 includes a compression unit 131 and an analyzing unit 132.

The machine learning unit 15 includes a selection unit 151, a model reading unit 152, a learning unit 153, an evaluation unit 154, a model storing unit 155, an evaluation value storing unit 156, and a weight update unit 157.

The machining data acquiring unit 11 acquires and stores a plurality of pieces of machining data from the control device 2.

The machining data pre-processing unit 111 of the machining data acquiring unit 11 acquires machining data from the control device 2, and shapes the acquired machining data by applying a low-pass filter or the like. Note that the machining data pre-machining unit 111 acquires machining data for a preset period, such as one hour, from the control device 2.

The machining data pre-processing unit 111 stores the processed data after shaping in the machining data storing unit 112.

The machining data storing unit 112 stores a plurality of pieces of machining data shaped by the machining data pre-processing unit 111.

Here, the machining data acquiring unit 11 stores, in the machining data storing unit 112, some machining data of the plurality of pieces of machining data after shaping, as machining data for evaluation, separately from the plurality of pieces of other machining data. The machining data for evaluation may be one or more. The machining data acquiring unit 11 may select machining data for evaluation randomly from a plurality of pieces of machining data, or may select machining data for evaluation according to a determined rule. The determined rule is, for example, that machining data acquired in the second half 10 minutes of a preset period such as one hour is used as machining data for evaluation.

Note that, here, the machining data storing unit 112 is included in the transfer learning device 1, but this is merely an example. The machining data storing unit 112 may be provided outside the transfer learning device 1 in a place that can be referred to by the transfer learning device 1.

The preliminary learning data acquiring unit 12 acquires a plurality of pieces of preliminary learning data stored in the preliminary learning data storing unit 31 of the storage device 3.

The preliminary learning data acquiring unit 12 outputs the plurality of pieces of obtained preliminary learning data to the analysis unit 13.

The analysis unit 13 calculates the importance for the plurality of pieces of machining data after shaping on the basis of the plurality of pieces of machining data after shaping stored in the machining data storing unit 112 in the machining data acquiring unit 11 and the plurality of pieces of preliminary learning data output from the preliminary learning data acquiring unit 12. Hereinafter, the machining data after the shaping is simply referred to as machining data. The analysis unit 13 calculates the importance for each piece of machining data.

In the first embodiment, the importance for the machining data calculated by the analysis unit 13 indicates the degree of effectiveness in learning in a case where the machining data is used as learning data when the second machine learning model is generated.

Note that the plurality of pieces of machining data after shaping acquired by the analysis unit 13 from the machining data storing unit 112 is machining data other than the machining data for evaluation. The machining data for evaluation stored in the machining data storing unit 112 is used when the evaluation unit 154 evaluates the second machine learning model. Details of the evaluation unit 154 will be described later.

First, in the analysis unit 13, the compression unit 131 compresses a plurality of pieces of machining data and a plurality of pieces of preliminary learning data. The analysis unit 13 may compress a plurality of pieces of machining data and a plurality of pieces of preliminary learning data by using a known dimension reduction method such as an autoencoder (AE), a principal component analysis (PCA), or a T-distributed Stochastic Neighbor embedding (t-SNE).

Since the compression unit 131 compresses the plurality of pieces of machining data and the plurality of pieces of preliminary learning data, the calculation machining of the importance for the machining data in the analysis unit 13 can be reduced.

The analyzing unit 132 calculates the importance for each piece of machining data after compression on the basis of a plurality of pieces of machining data (hereinafter referred to as "machining data after compression") after compression by the compression unit 131 and a plurality of pieces of preliminary learning data (hereinafter, referred to as "preliminary learning data after compression") after compression by the compression unit 131.

The analyzing unit 132 calculates the importance of the machining data after compression by detecting a steep change in the data related to the machining condition included in the machining data after compression by, for example, a change point detection method. Specifically, the analyzing unit 132 acquires a score indicating that there is a steep change in the time-series command speed data or the time-series command acceleration data included in the data related to the machining condition. The analyzing unit 132 calculates the importance for the machining data after compression in such a way that the higher the acquired score, the higher the importance. The analyzing unit 132 may use the acquired score as the importance, or may calculate the importance by substituting the acquired score into a predetermined calculation formula. The speed or acceleration is a control parameter that causes a position error. The analyzing unit 132 calculates the importance depending on whether there is a steep change in the control parameter that causes the position error. Note that, when calculating the importance by the change point detection method, the analyzing unit 132 does not need a plurality of pieces of preliminary learning data after compression.

In addition, for example, the analyzing unit 132 may obtain an inter-data distance between a plurality of pieces of machining data after compression and a plurality of pieces of preliminary learning data after compression, and calculate the inter-data distance as the importance.

Specifically, the analyzing unit 132 performs "inter-data distance calculation machining" for each piece of machining data after compression.

In the "inter-data distance calculation machining", the analyzing unit 132 selects certain preliminary learning data (hereinafter, referred to as "target preliminary learning data") among the plurality of pieces of preliminary learning data after compression, and calculates an inter-data distance between the machining data after compression and the target preliminary learning data. The analyzing unit 132 repeats the calculation of the inter-data distance between the machining data after compression and the target preliminary learning data until all pieces of the preliminary learning data are selected as the target preliminary learning data. Then, the analyzing unit 132 sets the maximum inter-data distance among the calculated inter-data distances as the inter-data distance between the machining data after compression and the plurality of pieces of preliminary learning data after compression.

The analyzing unit 132 performs the "inter-data distance calculation machining" on all of the plurality of pieces of machining data after compression, and calculates an inter-data distance between each piece of machining data after compression and a plurality of pieces of preliminary learning data after compression. The analyzing unit 132 calculates the importance of the machining data after compression in such a way that the larger the inter-data distance between the machining data after compression and the plurality of pieces of preliminary learning data after compression, the higher the importance.

Note that, in the "inter-data distance calculation machining", the analyzing unit 132 is only required to calculate at least an inter-data distance between the data related to the machining condition included in the machining data after compression and the data related to the machining condition included in the plurality of pieces of preliminary learning data after compression.

In addition, for example, the analyzing unit 132 may perform "inference error calculation machining" of calculating the importance on the basis of an error (hereinafter, referred to as "inference error") between data related to a machining state (hereinafter referred to as a "first inference result") obtained by inputting, to the first machine learning model, data related to a machining condition included in a plurality of pieces of machining data stored in the machining data storing unit 112 in the machining data acquiring unit 11 and data related to a machining state included in a plurality of pieces of machining data stored in the machining data storing unit 112 in the machining data acquiring unit 11.

The analyzing unit 132 performs "inference error calculation machining" for each piece of machining data.

In the "inference error calculation machining", the analyzing unit 132 calculates an inference error between the first inference result and the data related to the machining state included in the machining data. The analyzing unit 132 performs the "inference error calculation machining" on all the plurality of pieces of machining data and calculates an inference error corresponding to each piece of machining data.

The analyzing unit 132 calculates the importance of the machining data in such a way that the larger the inference error corresponding to the machining data, the higher the importance.

As described above, the analyzing unit 132, when calculating the importance by performing the "inference error calculation machining", performs the "inference error calculation machining" on each piece of machining data before compression, instead of each machining data after compression, to calculate the importance for each piece of machining data.

In the case of performing the inference error calculation machining, the analyzing unit 132 may read the first machine learning model from the preliminary learning model storing unit 32 of the storage device 3, for example.

In addition, for example, the analyzing unit 132 may calculate the importance from a result of classification of a plurality of pieces of machining data after compression and a plurality of pieces of preliminary learning data after compression using a classification method by a so-called decision tree. The analyzing unit 132 sets the importance calculated for the machining data after compression to be higher as the machining data after compression has more pieces of preliminary learning data after compression that are not classified into the same classification.

Note that, the analyzing unit 132 is only required to classify at least the data related to the machining condition included in the machining data after compression and the data related to the machining condition included in the plurality of pieces of preliminary learning data after compression.

When the analyzing unit 132 calculates the importance for the plurality of pieces of machining data after compression, the analysis unit 13 outputs each piece of machining data after compression and the importance to the extraction unit 14 in association with each other.

Note that, in a case where the analyzing unit 132 calculates the importance for a plurality of pieces of machining data by performing the "inference error calculation machining", the analysis unit 13 outputs each piece of machining data and the importance to the extraction unit 14 in association with each other.

The extraction unit 14 extracts a plurality of pieces of machining data for performing transfer learning of the first machine learning model, in other words, transfer learning data, from among the plurality of pieces of machining data acquired by the machining data acquiring unit 11 on the basis of the importance calculated by the analysis unit 13.

For example, information that can specify the machining data, such as information on the acquisition date and time of the machining data, is assigned to the machining data, and the extraction unit 14 associates the machining data after compression output from the analysis unit 13 with the machining data acquired by the machining data acquiring unit 11 with the information that can specify the machining data. As a result, the extraction unit 14 can determine the importance corresponding to the plurality of pieces of machining data acquired by the machining data acquiring unit 11. Note that, when the machining data is output from the analysis unit 13, the extraction unit 14 may associate the machining data output from the analysis unit 13 with the machining data acquired by the machining data acquiring unit 11.

The extraction unit 14 associates the plurality of pieces of machining data acquired by the machining data acquiring unit 11 with the importance calculated by the analysis unit 13, and sorts the plurality of pieces of machining data in descending order of importance. Then, the extraction unit 14 extracts, for example, a predetermined number of pieces of machining data in descending order of importance as transfer learning data.

Furthermore, the extraction unit 14 also extracts a feature amount when extracting the transfer learning data.

For example, for each piece of machining data, the extraction unit 14 extracts a feature amount using a known moving average method with respect to data related to a machining condition included in the machining data, and uses machining data including data related to the machining condition after the extraction of the feature amount and data related to a machining state as the transfer learning data. For example, the extraction unit 14 may extract, for each piece of machining data, a maximum value and a minimum value of data related to a machining condition included in the machining data as feature amounts, and may use, as the transfer learning data, the machining data including the data related to the machining condition after the extraction of the feature amounts and the data related to the machining state. For example, taking the speed data included in the data related to the machining condition as an example, the extraction unit 14 extracts the maximum value and the minimum value of the time-series speed data as the feature amounts. The extraction unit 14 extracts a maximum value and a minimum value as feature amounts for each piece of data indicating the control parameter included in the data related to the machining condition.

Furthermore, for example, the extraction unit 14 calculates feature amount importance using LightGBM for the data related to the machining condition included in each piece of machining data, and multiplies the data related to the machining condition assumed to be unimportant on the basis of the calculated feature amount importance, in other words, the data related to the machining condition in which the feature amount importance is "0" by "0" to apply a mask. Describing with a specific example, it is now assumed that, for example, the data related to the machining condition includes command speed data, command acceleration data, current command data, and command position data. Then, it is assumed that, as a result of calculating the feature amount importance with respect to the data related to the machining condition using LightGBM, the feature amount importance with respect to the position data is "0", and the feature amount importance with respect to the other speed data, acceleration data, and current data is "1" or more. In this case, the extraction unit 14 multiplies the position data by "0" and applies a mask. The extraction unit 14 uses, as the transfer learning data, the machining data including the data related to the machining condition after applying the mask and the data related to the machining state.

The extraction unit 14 outputs, to the machine learning unit 15, a plurality of pieces of transfer learning data with which the importance calculated by the analysis unit 13 has been associated and from which the feature amount has been extracted.

The machine learning unit 15 performs transfer learning of the first machine learning model using the plurality of pieces of transfer learning data output from the extraction unit 14, and generates the second machine learning model.

The machine learning unit 15 will be described in detail.

The selection unit 151 selects a plurality of pieces of transfer learning data (hereinafter, referred to as "selected transfer learning data") for generating the second machine learning model from among the plurality of pieces of transfer learning data.

Specifically, the selection unit 151 assigns a priority to each of the plurality of pieces of transfer learning data output from the extraction unit 14, and selects the selected transfer learning data on the basis of the assigned priority. In the first embodiment, the priority assigned to the transfer learning data by the selection unit 151 indicates a degree to which the transfer learning data to which the priority is assigned should be prioritized to be used for generation of the second machine learning model.

First, when a plurality of pieces of transfer learning data are output from the extraction unit 14, the selection unit 151 assigns priority to the plurality of pieces of transfer learning data. For example, the selection unit 151 uniformly assigns an initial value of the priority to each piece of transfer learning data. The initial value of the priority can be appropriately set in advance. Furthermore, for example, the selection unit 151 may use the importance associated with a plurality of pieces of transfer learning data as the priority. The machining in which the selection unit 151 assigns priority to the plurality of pieces of transfer learning data when the plurality of pieces of transfer learning data are output from the extraction unit 14 is also referred to as "priority initial setting machining".

The selection unit 151, when assigning a priority to each piece of transfer learning data in the "priority initial setting machining", selects the selected transfer learning data on the basis of the assigned priority.

For example, the selection unit 151 selects a preset number of pieces of transfer learning data as the selected transfer learning data in descending order of assigned priority among the plurality of pieces of transfer learning data. For example, in a case where the same priority is uniformly assigned, the selection unit 151 may randomly select the selected transfer learning data.

In addition, in a case where the selected transfer learning data in which the assigned priority is updated is output from the weight update unit 157, the selection unit 151 samples the selected transfer learning data on the basis of the updated priority. For example, the selection unit 151 samples the selected transfer learning data having a priority equal to or higher than a preset threshold for the updated priority.

Details of the weight update unit 157 will be described later. Details of the sampling of the selected transfer learning data by the selection unit 151 will also be described later together with the description of the weight update unit 157.

The selection unit 151 outputs, to the learning unit 153, the selected transfer learning data selected when the plurality of pieces of transfer learning data are output from the extraction unit 14.

In a case where the selected transfer learning data is sampled on the basis of the selected transfer learning data output from the weight update unit 157, the selection unit 151 outputs the selected transfer learning data after sampling to the learning unit 153.

The model reading unit 152 reads the first machine learning model stored in the preliminary learning model storing unit 32 of the storage device 3.

Note that, the learning unit 153 may have the function of the model reading unit 152. In this case, the transfer learning device 1 can be configured not to include the model reading unit 152.

The learning unit 153 uses the plurality of pieces of selected transfer learning data output from the selection unit 151 to perform transfer learning of the first machine learning model read by the model reading unit 152, and generates the second machine learning model that receives, as an input, data related to a time-series machining condition for a plurality of steps and outputs data related to a machining state after execution for the plurality of steps. That is, the data related to the machining state included in the selected transfer learning data is the teacher label.

The learning unit 153 stores the generated second machine learning model in the model storing unit 155.

In addition, the learning unit 153 outputs the generated second machine learning model to the evaluation unit 154 together with the selected transfer learning data used when the second machine learning model is generated. The learning unit 153 assigns the priority assigned when the selected transfer learning data is output from the selection unit 151 to the selected transfer learning data.

The machine learning method used by the learning unit 153 may be any method as long as supervised learning is possible. The learning unit 153 generates the second machine learning model by so-called supervised learning.

Note that, in a case where the extraction unit 14 uses a known moving average method or a method of extracting the maximum value and the minimum value of the data related to the machining condition when extracting the feature amount, the selected transfer learning data has a data configuration different from that of the preliminary learning data when the first machine learning model is generated. That is, the selected transfer learning data does not match the input of the first machine learning model. Therefore, in this case, for example, the learning unit 153 inputs the selected transfer learning data to a machine learning model (hereinafter, referred to as a "third machine learning model") prepared in advance and different from the first machine learning model to perform dimension reduction (feature amount extraction). In addition, in parallel with this, the learning unit 153 inputs the selected transfer learning data in a state where the feature amount is not extracted to the first machine learning model to be learned halfway, and performs dimension reduction (feature amount extraction). Note that the learning unit 153 may acquire the selected transfer learning data in a state where the feature amount is not extracted from the extraction unit 14 via the selection unit 151. Then, the learning unit 153 performs transfer learning in which data obtained by performing learning partway with the first machine learning model and data obtained from the third machine learning model are combined and input to a machine learning model (hereinafter, referred to as a "fourth machine learning model") different from the first machine learning model and the third machine learning model prepared in advance to obtain data related to the machining state. The fourth machine learning model is a machine learning model that receives, as an input, data obtained by combining data obtained by partway learning of the first machine learning model and data obtained from the third machine learning model, and outputs data related to a machining state.

The evaluation unit 154 evaluates the second machine learning model generated by the learning unit 153.

In the first embodiment, the evaluation unit 154 evaluates the second machine learning model by two methods.

As the first evaluation method, the evaluation unit 154 evaluates the second machine learning model by evaluating each of a plurality of pieces of selected transfer learning data used when the second machine learning model is generated by the learning unit 153. The evaluation method is also referred to as "first evaluation". For example, assuming that the learning unit 153 generates the second machine learning model using five pieces of selected transfer learning data, the evaluation unit 154 evaluates each of the five pieces of selected transfer learning data.

As the second evaluation method, the evaluation unit 154 evaluates the second machine learning model by evaluating the entire plurality of pieces of selected transfer learning data used when the second machine learning model is generated by the learning unit 153. The evaluation method is also referred to as "second evaluation". For example, in the above example, the evaluation unit 154 evaluates the entire five pieces of selected transfer learning data.

The evaluation unit 154 evaluates the plurality of pieces of selected transfer learning data by calculating evaluation values for the plurality of pieces of selected transfer learning data using, for example, an error (for example, the mean square error or the mean absolute error).

Specifically, first, the evaluation unit 154 inputs data related to the machining condition included in the plurality of pieces of selected transfer learning data to the second machine learning model, and obtains data related to the machining state. At this time, data related to the machining state is obtained by the number of pieces of selected transfer learning data. The evaluation unit 154 calculates an evaluation value (hereinafter referred to as "individual evaluation value") for each piece of selected transfer learning data by calculating an error between data related to each machining state obtained on the basis of the second machine learning model and corresponding data related to the machining state included in the plurality of pieces of transfer learning data. This is the first evaluation.

Describing with a specific example, for example, it is assumed that there are five pieces of selected transfer learning data (first selected transfer learning data, second selected transfer learning data, third selected transfer learning data, fourth selected transfer learning data, and fifth selected transfer learning data), and the data related to the machining state included in each piece of selected transfer learning data is "0.15", "0.32", "0.10", "−0.52", and "−0.11". Note that each of these pieces of data related to the machining state is data that has become a teacher label when the learning unit 153 generates the second machine learning model.

On the other hand, it is assumed that pieces of data related to the machining condition obtained by the evaluation unit 154 inputting the data related to the machining condition included in the first selected transfer learning data, the data related to the machining condition included in the second selected transfer learning data, the data related to the machining condition included in the third selected transfer learning data, the data related to the machining condition included in the fourth selected transfer learning data, and the data related to the machining condition included in the fifth selected transfer learning data to the second machine learning model are "0.10", "0.28", "0.14", "−0.14", and "−0.19", respectively.

In this case, the evaluation unit 154 calculates an individual evaluation value "0.05" (absolute error between "0.15" and "0.10") for the first selected transfer learning data. In addition, the evaluation unit 154 calculates an individual evaluation value "0.04" (absolute error between "0.32" and "0.28") for the second selected transfer learning data. In addition, the evaluation unit 154 calculates an individual evaluation value "0.04" (absolute error between "0.10" and "0.14") for the third selected transfer learning data. In addition, the evaluation unit 154 calculates an individual evaluation value "0.38" (absolute error between "−0.52" and "−0.14") for the fourth selected transfer learning data. In addition, the evaluation unit 154 calculates an individual evaluation value "0.08" (absolute error between "−0.11" and "−0.19") for the fifth selected transfer learning data.

Next, the evaluation unit 154 calculates an average value of the evaluation values for each piece of the selected transfer learning data calculated by performing the first evaluation, thereby calculating an evaluation value (hereinafter, referred to as an "entire evaluation value") for the entire plurality of pieces of selected transfer learning data. This is the second evaluation.

In the specific example described above, the evaluation unit 154 calculates an entire evaluation value "0.118" (the average absolute error of "0.05", "0.04", "0.04", "0.38", and "0.08") for the entire plurality of pieces of selected transfer learning data (first selected transfer learning data, second selected transfer learning data, third selected transfer learning data, fourth selected transfer learning data, and fifth selected transfer learning data).

The evaluation unit 154 outputs each piece of selected transfer learning data and the corresponding individual evaluation value to the weight update unit 157 in association with each other for the plurality of pieces of selected transfer learning data.

In addition, the evaluation unit 154 stores the plurality of pieces of selected transfer learning data and the entire evaluation value in the evaluation value storing unit 156 in association with each other. For example, the evaluation unit 154 may store the plurality of pieces of selected transfer learning data, the entire evaluation value, and the second machine learning model in the evaluation value storing unit 156 in association with one another.

Note that, the evaluation unit 154 calculates an entire evaluation value for the entire plurality of pieces of selected transfer learning data, and also calculates an evaluation value (hereinafter, referred to as an "entire test evaluation value") for the entire machining data for evaluation. The machining data for evaluation is stored in the machining data storing unit 112 by the machining data acquiring unit 11. The evaluation unit 154 generates the second machine learning model on the basis of the machining data for evaluation and the first machine learning model. Then, the evaluation unit 154 may calculate the entire test evaluation value for the entire machining data for evaluation by the same method as the second evaluation performed on the plurality of pieces of selected transfer learning data.

The evaluation unit 154 stores the machining data for evaluation and the entire test evaluation value in the evaluation value storing unit 156 in association with each other. For example, the evaluation unit 154 may store the machining data for evaluation, the entire test evaluation value, and the second machine learning model in the evaluation value storing unit 156 in association with one another.

The model storing unit 155 stores the second machine learning model generated by the learning unit 153.

Note that, here, the model storing unit 155 is included in the transfer learning device 1, but this is merely an example. The model storing unit 155 may be provided at a place that can be referred to by the transfer learning device 1 outside the transfer learning device 1. For example, the model storing unit 155 may be provided in the control device 2 or the storage device 3.

The evaluation value storing unit 156 stores the plurality of pieces of selected transfer learning data associated with the entire evaluation value output from the evaluation unit 154. In addition, the evaluation value storing unit 156 stores the machining data for evaluation output from the evaluation unit 154 and associated with the entire test evaluation value.

Note that, here, the evaluation value storing unit 156 is included in the transfer learning device 1, but this is merely an example. The evaluation value storing unit 156 may be provided outside the transfer learning device 1 at a place that can be referred to by the transfer learning device 1. For example, the evaluation value storing unit 156 may be provided in the control device 2 or the storage device 3.

The weight update unit 157 updates the priority assigned to each piece of selected transfer learning data on the basis of the evaluation result of the second machine learning model performed by the evaluation unit 154.

The evaluation result of the second machine learning model performed by the evaluation unit 154 is, that is, a plurality of pieces of selected transfer learning data associated with individual evaluation values output from the evaluation unit 154.

The weight update unit 157 updates the priority for each piece of selected transfer learning data.

For example, the weight update unit 157 updates the priority assigned to each piece of selected transfer learning data with each of the individual evaluation values associated with the plurality of selected transfer learning data. For example, the weight update unit 157 may calculate the priority by substituting the individual evaluation value into a preset conditional expression for calculating the priority, and update the priority assigned to the selected transfer learning data with the calculated priority. The weight update unit 157 updates the priority in such a way that the priority assigned to the selected transfer learning data becomes higher as the associated individual evaluation value is lower.

The weight update unit 157 outputs a plurality of pieces of selected transfer learning data to which the updated priority is assigned to the selection unit 151.

When the plurality of pieces of selected transfer learning data to which the updated priority is assigned is output from the weight update unit 157, the selection unit 151 samples the plurality of pieces of selected transfer learning data on the basis of the priority.

For example, the selection unit 151 samples the selected transfer learning data having a priority equal to or higher than a preset threshold (hereinafter, referred to as a "sampling threshold").

Then, the selection unit 151 outputs the selected transfer learning data after sampling to the learning unit 153. The priority updated by the weight update unit 157 is assigned to the selected transfer learning data sampled by the selection unit 151.

When the selected transfer learning data after sampling is output from the selection unit 151, the learning unit 153 relearns the second machine learning model. When the learning unit 153 performs relearning, the evaluation unit 154 evaluates the second machine learning model generated by the relearning, and the weight update unit 157 updates the priority. While the selected transfer learning data after sampling is output from the selection unit 151, learning by the learning unit 153, evaluation of the second machine learning model by the evaluation unit 154, and update of the priority by the weight update unit 157 are repeated.

Note that the selection unit 151 performs sampling of the selected transfer learning data after determining whether or not relearning by the learning unit 153 is necessary.

The selection unit 151, in a case of determining that relearning by the learning unit 153 is unnecessary, stops sampling of the selected transfer learning data. As a result, the generation of the second machine learning model by the learning unit 153 is completed.

For example, in a case where the priority assigned to each piece of selected transfer learning data updated by the weight update unit 157 is equal to or less than a preset threshold (hereinafter, referred to as a "first stopping threshold"), the selection unit 151 determines that relearning by the learning unit 153 is unnecessary. For example, in a case where both the entire evaluation value and the entire test evaluation value stored in the evaluation value storing unit 156 are equal to or greater than a preset threshold (hereinafter, referred to as a "second stopping threshold"), the selection unit 151 may determine that relearning by the learning unit 153 is unnecessary.

When the generation of the second machine learning model by the learning unit 153 is completed, for example, the control device 2, when causing the machining machine 4 to execute machining, uses the second machine learning model to infer a position error in the process of machining. Then, for example, the control device 2 sets the machining condition in such a way that the position error can be corrected on the basis of the inference result. Furthermore, for example, the control device 2 may notify the user of the inference result by causing a display device (not illustrated) included in the control device 2 to display the inference result.

An operation of the transfer learning device 1 according to the first embodiment will be described.

Figure 4:
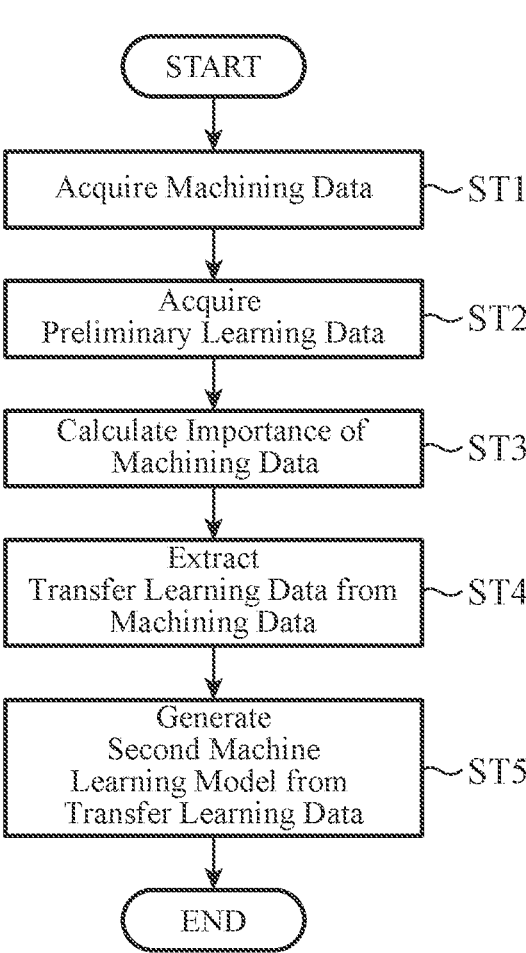
FIG. 4 is a flowchart for explaining the operation of the transfer learning device according to the first embodiment.

FIG. 4 is a flowchart for explaining the operation of the transfer learning device 1 according to the first embodiment.

The machining data acquiring unit 11 acquires and stores a plurality of pieces of machining data from the control device 2 (step ST1).

Specifically, in step ST1, the machining data pre-processing unit 111 of the machining data acquiring unit 11 acquires the machining data from the control device 2 and shapes the acquired machining data. Then, the machining data pre-processing unit 111 stores the processed data after shaping in the machining data storing unit 112.

The preliminary learning data acquiring unit 12 acquires a plurality of pieces of preliminary learning data stored in the preliminary learning data storing unit 31 of the storage device 3 (step ST2).

The preliminary learning data acquiring unit 12 outputs the plurality of pieces of obtained preliminary learning data to the analysis unit 13.

The analysis unit 13 calculates the importance for the plurality of pieces of machining data after shaping on the basis of the plurality of pieces of machining data after shaping stored in the machining data storing unit 112 in the machining data acquiring unit 11 and the plurality of pieces of preliminary learning data output from the preliminary learning data acquiring unit 12 (step ST3).

The analysis unit 13 outputs each piece of machining data (machining data after compression) and the importance to the extraction unit 14 in association with each other.

The extraction unit 14 extracts a plurality of pieces of machining data for performing transfer learning of the first machine learning model, in other words, transfer learning data, from among the plurality of pieces of machining data acquired by the machining data acquiring unit 11 in step ST1 on the basis of the importance calculated by the analysis unit 13 in step ST3 (step ST4).

The extraction unit 14, when extracting the transfer learning data, also extracts a feature amount.

The extraction unit 14 outputs, to the machine learning unit 15, a plurality of pieces of transfer learning data to which the importance calculated by the analysis unit 13 in step ST3 have been associated and from which the feature amount has been extracted.

The machine learning unit 15 performs transfer learning of the first machine learning model using the plurality of pieces of transfer learning data output from the extraction unit 14 in step ST4, and generates the second machine learning model (step ST5).

Figure 5:
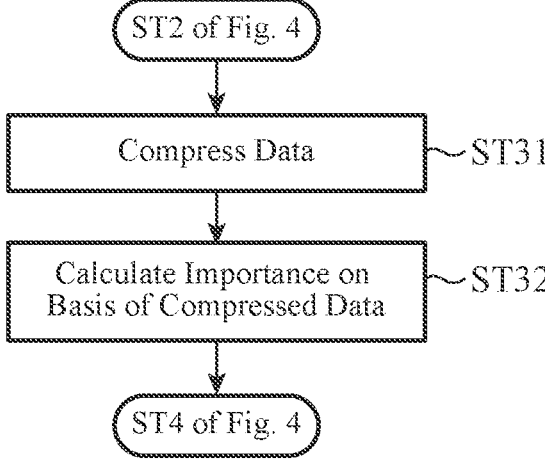
FIG. 5 is a flowchart for explaining in detail the operation of the analysis unit of the transfer learning device according to the first embodiment.

FIG. 5 is a flowchart for explaining in detail the operation of the analysis unit 13 of the transfer learning device 1 according to the first embodiment. That is, FIG. 5 is a flowchart for explaining in detail the machining of step ST3 in FIG. 4.

First, in the analysis unit 13, the compression unit 131 compresses a plurality of pieces of machining data and a plurality of pieces of preliminary learning data (step ST31).

The analyzing unit 132 calculates the importance for each piece of machining data after compression on the basis of the plurality of pieces of machining data after compression compressed by the compression unit 131 in step ST31 and the plurality of pieces of preliminary learning data after compression compressed by the compression unit 131 (step ST32).

When the analyzing unit 132 calculates the importance for the plurality of pieces of machining data after compression, the analysis unit 13 outputs each piece of machining data after compression and the importance to the extraction unit 14 in association with each other.

Figure 6:
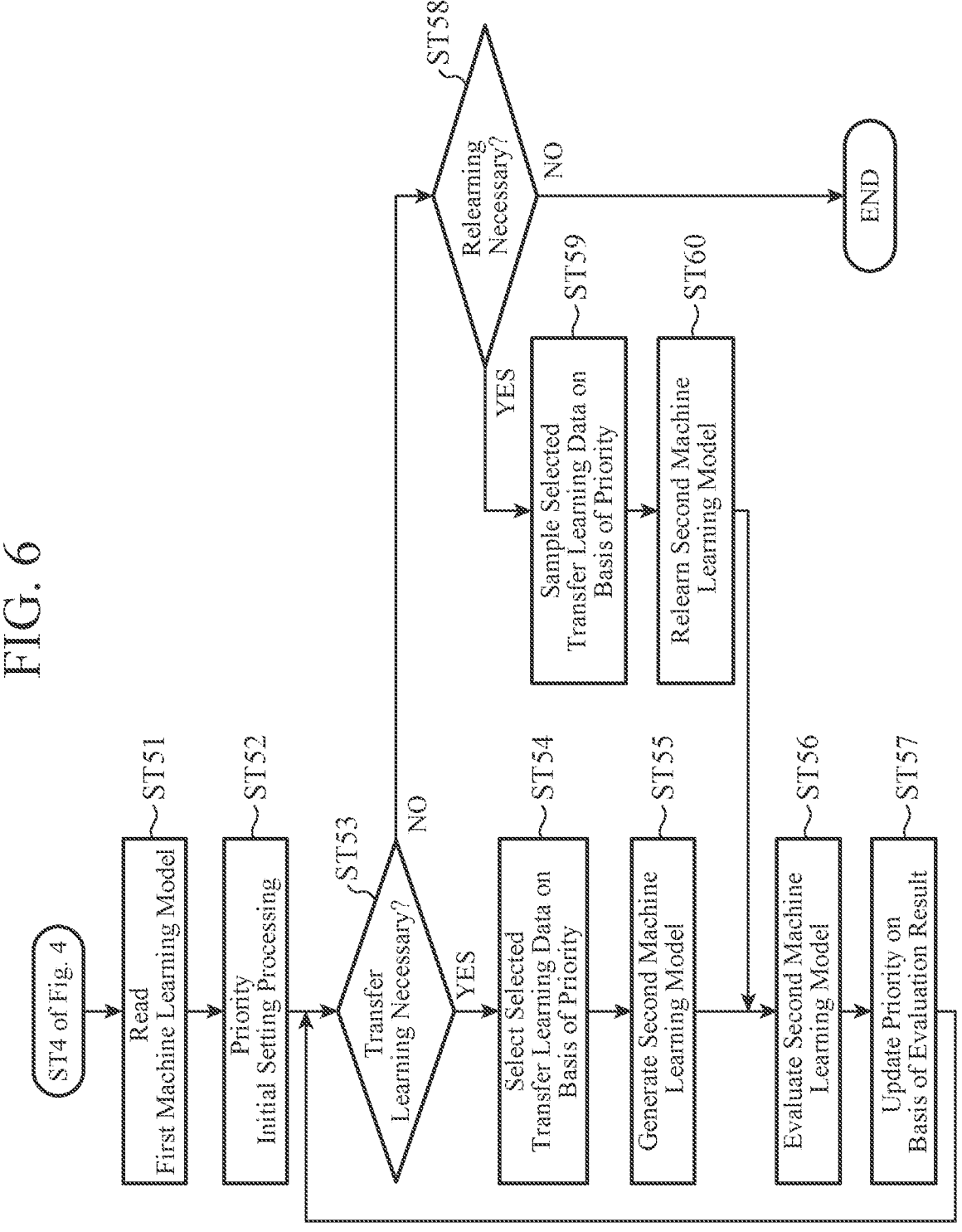
FIG. 6 is a flowchart for explaining in detail the operation of machine learning of the transfer learning device according to the first embodiment.

FIG. 6 is a flowchart for explaining in detail the operation of the machine learning unit 15 of the transfer learning device 1 according to the first embodiment. That is, FIG. 6 is a flowchart for explaining in detail the machining of step ST5 in FIG. 4.

The model reading unit 152 reads the first machine learning model stored in the preliminary learning model storing unit 32 of the storage device 3 (step ST51).

When a plurality of pieces of transfer learning data are output from the extraction unit 14, the selection unit 151 performs "priority initial setting machining" (step ST52).

The selection unit 151 determines whether or not transfer learning is necessary (step ST53). Specifically, the selection unit 151 determines whether or not generation of the second machine learning model is necessary on the basis of transfer learning. In a case where the second machine learning model has not been generated yet, the selection unit 151 determines that transfer learning is necessary. On the other hand, in a case where the second machine learning model has been generated, the selection unit 151 determines that the transfer learning is unnecessary. Note that, for example, the learning unit 153, when generating the second machine learning model, sets "1" to a model generation completion flag that can be referred to by the machine learning unit 15. The selection unit 151 may determine whether or not the second machine learning model has been generated depending on whether or not "1" is set to the model generation completion flag. The model generation completion flag is initialized, for example, when the second machine learning model is completed.

The selection unit 151, when determining that the transfer learning is necessary (in the case of "YES" in step ST53), selects the selected transfer learning data on the basis of the priority assigned to each piece of transfer learning data in "priority initial setting machining" in step ST52 (step ST54).

The learning unit 153 performs transfer learning of the first machine learning model read by the model reading unit 152 in step ST51 by using the plurality of pieces of selected transfer learning data output from the selection unit 151 in step ST54, and generates the second machine learning model (step ST55).

The learning unit 153 stores the generated second machine learning model in the model storing unit 155.

In addition, the learning unit 153 outputs the generated second machine learning model to the evaluation unit 154 together with the selected transfer learning data used when the second machine learning model is generated.

The evaluation unit 154 evaluates the second machine learning model generated by the learning unit 153 in step ST55 (step ST56). Specifically, the evaluation unit 154 evaluates each of the plurality of pieces of selected transfer learning data used when the second machine learning model is generated by the learning unit 153 and evaluates the entire plurality of pieces of selected transfer learning data.

The evaluation unit 154 outputs each piece of selected transfer learning data and the corresponding individual evaluation value to the weight update unit 157 in association with each other for the plurality of pieces of selected transfer learning data.

In addition, the evaluation unit 154 stores the plurality of pieces of selected transfer learning data and the entire evaluation value in the evaluation value storing unit 156 in association with each other. For example, the evaluation unit 154 may store the plurality of pieces of selected transfer learning data, the entire evaluation value, and the second machine learning model in the evaluation value storing unit 156 in association with one another.

Note that in step ST56, the evaluation unit 154 also calculates an entire test evaluation value for the entire machining data for evaluation by the evaluation unit 154. The evaluation unit 154 stores the machining data for evaluation and the entire test evaluation value in the evaluation value storing unit 156 in association with each other.

The weight update unit 157 updates the priority assigned to each piece of selected transfer learning data on the basis of the evaluation result of the second machine learning model performed by the evaluation unit 154 in step ST56 (step ST57). Thereafter, the operation of the machine learning unit 15 returns to step ST53.

On the other hand, in a case where it is determined in step ST53 that transfer learning is not necessary ("NO" in step ST53), that is, in a case where the second machine learning model has been generated, the selection unit 151 determines whether or not relearning by the learning unit 153 is necessary (step ST58).

In a case where it is determined that relearning by the learning unit 153 is necessary (in the case of "YES" in step ST58), the selection unit 151 samples the selected transfer learning data (step ST59).

The selection unit 151 outputs the selected transfer learning data after sampling to the learning unit 153.

When the selected transfer learning data after sampling is output from the selection unit 151 in step ST59, the learning unit 153 relearns the second machine learning model (step ST60).

Then, the operation of the machine learning unit 15 proceeds to machining of step ST56. Note that, in this case, in step ST56, the evaluation unit 154 evaluates the second machine learning model relearned by the learning unit 153. Thereafter, the machining of step ST56 is performed, and the operation of the machine learning unit 15 returns to the machining of step ST53.

On the other hand, in step ST58, in a case where the selection unit 151 determines that relearning by the learning unit 153 is unnecessary (in the case of "NO" in step ST58), the selection unit 151 stops sampling of the selected transfer learning data. As a result, the generation of the second machine learning model by the learning unit 153 is completed. Then, the machine learning unit 15 ends the machining illustrated in the flowchart of FIG. 6.

Note that, regarding the operation of the transfer learning device 1 described with reference to the flowchart illustrated in FIG. 4, the machining is performed in the order of step ST1 and step ST2 in the flowchart of FIG. 4, but it is not essential to perform the machining in this order. For example, the machining may be performed in the order of step ST2 and step ST1, or the machining of step ST1 and the machining of step ST2 may be performed in parallel.

Furthermore, regarding the detailed operation of the machine learning unit 15 described with reference to the flowchart illustrated in FIG. 6, in the flowchart of FIG. 6, the machining of step ST51 is first performed, but this is merely an example. The machining of step ST51 may be completed before the machining of step ST55 is performed.

As described above, the transfer learning device 1 calculates the importance for the plurality of pieces of machining data acquired from the control device 2, and extracts a plurality of pieces of transfer learning data for performing transfer learning of the first machine learning from among the plurality of pieces of machining data on the basis of the importance. Then, the transfer learning device 1 performs transfer learning of the first machine learning by using the plurality of pieces of extracted transfer learning data, and generates the second machine learning model.

As described above, at the site where the machining machine 4 is operated, the amount of machining data acquired from the control device 2 is enormous. Therefore, if the transfer learning device 1 simply performs transfer learning using all pieces of acquired machining data, even if the transfer learning is efficient learning, it takes time to generate the second machine learning model. On the other hand, the transfer learning device 1 according to the first embodiment calculates the importance for each piece of machining data acquired from the control device 2, and extracts the transfer learning data depending on the calculated importance.

As a result, the transfer learning device 1 can reduce the amount of data used to generate the second machine learning model. That is, the transfer learning device 1 does not require all pieces of machining data collected at the site of machining, and can generate the second machine learning model for setting the machining condition suitable for the situation of the machining machine 4 at the site where the machining machine 4 actually operates from a part of the machining data. As a result, the transfer learning device 1 can efficiently generate the second machine learning model without taking much time.

Note that the transfer learning device 1 extracts the transfer learning data on the basis of the importance, in other words, extracts, as the transfer learning data, the machining data having a high degree of being assumed to be effective when used as the learning data when the second machine learning model is generated. Therefore, even if the number is reduced, the machining data suitable for generating the second machine learning model can be used as the transfer learning data.

In addition, the transfer learning device 1 assigns priority to each piece of transfer learning data extracted on the basis of the importance, and selects a plurality of pieces of selected transfer learning data from among the plurality of pieces of transfer learning data on the basis of the priority. Then, the transfer learning device 1 performs transfer learning of the first machine learning model using the plurality of pieces of selected transfer learning data.

Thus, the transfer learning device 1 can further reduce the amount of data used to generate the second machine learning model. As a result, the transfer learning device 1 can generate the second machine learning model more efficiently.

In addition, the transfer learning device 1 evaluates the generated second machine learning model, and updates the priority assigned to the selected transfer learning data on the basis of the evaluation result. Then, the transfer learning device 1 samples the selected transfer learning data on the basis of the updated priority, and relearns the second machine learning model using the selected transfer learning data after sampling.

Thus, the transfer learning device 1 can increase the accuracy of the generated second machine learning model.

Figure 7A:
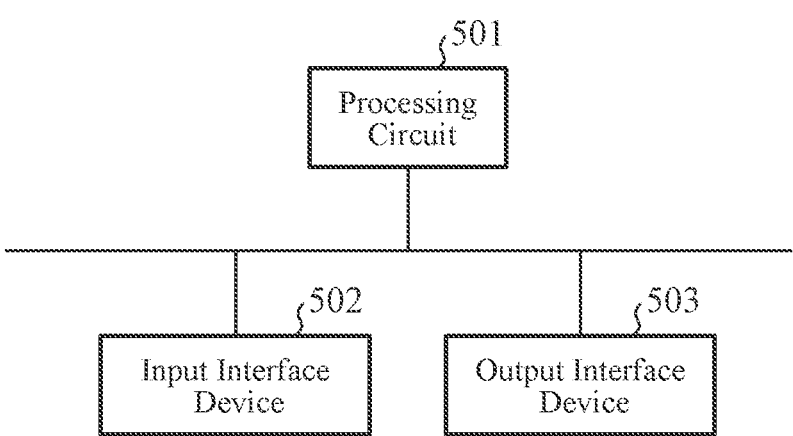
FIGS. 7A and 7B are diagrams illustrating an example of a hardware configuration of the transfer learning device according to the first embodiment.
Figure 7B:
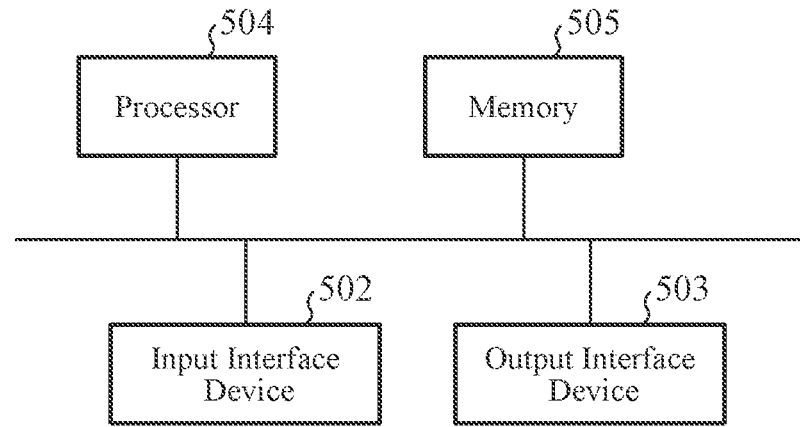

FIGS. 7A and 7B are diagrams illustrating an example of a hardware configuration of the transfer learning device 1 according to the first embodiment.

In the first embodiment, the functions of the machining data acquiring unit 11, the preliminary learning data acquiring unit 12, the analysis unit 13, the extraction unit 14, and the machine learning unit 15 are implemented by a machining circuit 501. That is, the transfer learning device 1 includes the machining circuit 501 for performing control to generate the second machine learning model by performing transfer learning on the basis of the first machine learning model generated in advance using the transfer learning data extracted from the plurality of pieces of machining data acquired from the control device 2.

The machining circuit 501 may be dedicated hardware as illustrated in FIG. 7A or a processor 504 that executes a program stored in a memory as illustrated in FIG. 7B.

In a case where the machining circuit 501 is dedicated hardware, the machining circuit 501 corresponds to, for example, a single circuit, a composite circuit, a programmed processor, a parallel programmed processor, an application specific integrated circuit (ASIC), a field-programmable gate array (FPGA), or a combination thereof.

In a case where the machining circuit is the processor 504, the functions of the machining data acquiring unit 11, the preliminary learning data acquiring unit 12, the analysis unit 13, the extraction unit 14, and the machine learning unit 15 are implemented by software, firmware, or a combination of software and firmware. The software or firmware is described as a program and stored in a memory 505. The processor 504 reads and executes the program stored in the memory 505, thereby executing the functions of the machining data acquiring unit 11, the preliminary learning data acquiring unit 12, the analysis unit 13, the extraction unit 14, and the machine learning unit 15. That is, the transfer learning device 1 includes the memory 505 for storing a program that results in execution of steps ST1 to ST5 in FIG. 4 described above when executed by the processor 504. In addition, it can also be said that the program stored in the memory 505 causes a computer to execute a procedure or a method performed in machining of the machining data acquiring unit 11, the preliminary learning data acquiring unit 12, the analysis unit 13, the extraction unit 14, and the machine learning unit 15. Here, the memory 505 corresponds to, for example, a nonvolatile or volatile semiconductor memory such as a RAM, a read only memory (ROM), a flash memory, an erasable programmable read only memory (EPROM), or an electrically erasable programmable read-only memory (EEPROM), or a magnetic disk, a flexible disk, an optical disk, a compact disk, a mini disk, a digital versatile disc (DVD), or the like.

Note that a part of the functions of the machining data acquiring unit 11, the preliminary learning data acquiring unit 12, the analysis unit 13, the extraction unit 14, and the machine learning unit 15 may be implemented by dedicated hardware, and a part thereof may be implemented by software or firmware. For example, the functions of the machining data acquiring unit 11 and the preliminary learning data acquiring unit 12 can be implemented by the machining circuit 501 as dedicated hardware, and the functions of the analysis unit 13, the extraction unit 14, and the machine learning unit 15 can be implemented by the processor 504 reading and executing programs stored in the memory 505.

The model storing unit 155 and the evaluation value storing unit 156 include, for example, a memory.

In addition, the transfer learning device 1 includes a device such as the control device 2 or the storage device 3, and an input interface device 502 and an output interface device 503 that perform wired communication or wireless communication.

Note that, as described above, in the first embodiment described above, when the analysis unit 13 calculates the importance of a plurality of pieces of machining data, the analysis unit 13 does not need a plurality of pieces of preliminary learning data in a case where the analysis unit calculates the importance by the change point detection method. Therefore, in this case, the transfer learning device 1 can be configured not to include the preliminary learning data acquiring unit 12.

Furthermore, in the first embodiment described above, in the transfer learning device 1, the analysis unit 13 includes the compression unit 131, but this is merely an example. The analysis unit 13 does not necessarily include the compression unit 131. In this case, the analyzing unit 132 calculates the importance for each piece of machining data on the basis of a plurality of pieces of uncompressed machining data and a plurality of pieces of uncompressed preliminary learning data. The function of the analyzing unit 132 may be included in the analysis unit 13, and the analysis unit 13 may not include the analyzing unit 132.

Furthermore, in the first embodiment described above, the transfer learning device 1 includes the evaluation unit 154 and the weight update unit 157, but this is merely an example. The transfer learning device 1 may be configured not to include the evaluation unit 154 and the weight update unit 157. In this case, the transfer learning device 1 does not have a function of relearning the second machine learning model.

Furthermore, the transfer learning device 1 may not include the selection unit 151. In this case, in the transfer learning device 1, the learning unit 153 may generate the second machine learning model by performing transfer learning of the first machine learning model using the plurality of pieces of transfer learning data extracted by the extraction unit 14.

Furthermore, in the first embodiment described above, in the transfer learning device 1, the machining data acquiring unit 11 includes the machining data pre-processing unit 111, but this is merely an example. The machining data acquiring unit 11 does not necessarily include the machining data pre-processing unit 111. In a case where the machining data pre-processing unit 111 is not provided, the machining data acquiring unit 11 stores a plurality of pieces of machining data acquired from the control device 2 in the machining data storing unit 112.

In addition, in the first embodiment described above, the transfer learning device 1 may be mounted on, for example, the control device 2 or the machining machine 4, or may be mounted on a server (not illustrated) to communicate with the control device 2. Furthermore, for example, a part of the machining data acquiring unit 11, the preliminary learning data acquiring unit 12, the analysis unit 13, the extraction unit 14, and the machine learning unit 15 may be included in the control device 2 or the machining machine 4, and the others may be included in the server.

In addition, in the first embodiment described above, the machining state is assumed to be a position error of the machining position actually executed by the machining machine 4 with respect to the machining position instructed by the machining machine 4. However, this is merely an example. In the first embodiment described above, the machining state may be, for example, whether or not the machining position actually executed by the machining machine 4 has a position error equal to or larger than a preset range with respect to the machining position instructed by the machining machine 4.

As described above, the transfer learning device 1 according to the first embodiment includes: the machining data acquiring unit 11 to acquire a plurality of pieces of machining data including data related to time-series machining conditions for causing a machining machine 4 to perform machining for a plurality of steps and data related to a machining state executed by the machining machine 4 for the plurality of steps on a basis of the machining conditions; the analysis unit 13 to calculate an importance with respect to each piece of machining data acquired by the machining data acquiring unit 11 on a basis of a plurality of pieces of the machining data acquired by the machining data acquiring unit 11; the extraction unit 14 to extract a plurality of pieces of transfer learning data for performing transfer learning of a first machine learning model that receives, as an input, the data related to the machining conditions in time series for the plurality of steps generated in advance from among a plurality of pieces of the machining data acquired by the machining data acquiring unit 11 on a basis of the importance calculated by the analysis unit 13 and outputs data related to a machining state after execution for the plurality of steps; and the learning unit 153 to perform the transfer learning of the first machine learning model by using a plurality of pieces of the transfer learning data extracted by the extraction unit 14, and generate a second machine learning model that receives, as an input, data related to the machining conditions in time series for the plurality of steps and outputs data related to a machining state after execution for the plurality of steps. As a result, the transfer learning device 1 does not require all pieces of data collected at the site of machining, and can generate the second machine learning model for setting the machining condition suitable for the situation of the machining machine at the site where the machining machine actually operates from a part of the data. As a result, the second machine learning model can be generated without requiring much time.

Note that any component of the embodiment can be modified, or any component of the embodiment can be omitted.

INDUSTRIAL APPLICABILITY

The transfer learning device according to the present disclosure can be used as a transfer learning device that generates, at a machining site, a second machine learning model for setting a machining condition suitable for a situation of a machining machine at the site where the machining machine actually operates.

REFERENCE SIGNS LIST

1: transfer learning device, 11: machining data acquiring unit, 111: machining data pre-machining unit, 112: machining data storing unit, 13: analysis unit, 131: compression unit, 132: analyzing unit, 14: extraction unit, 15: machine learning unit, 151: selection unit, 152: model reading unit, 153: learning unit, 154: evaluation unit, 155: model storing unit, 156: evaluation value storing unit, 157: weight update unit, 2: control device, 3: storage device, 31: preliminary learning data storing unit, 32: preliminary learning model storing unit, 4: machining machine, 501: machining circuit, 502: input interface device, 503: output interface device, 504: processor, 505: memory

The invention claimed is:

1. A transfer learning device, comprising:
processing circuitry performing:
to acquire a plurality of pieces of machining data including data related to time-series machining conditions for causing a machining machine to perform machining for a plurality of steps and data related to a machining state executed by the machining machine for the plurality of steps on a basis of the machining conditions;
to calculate an importance with respect to each piece of machining data acquired on a basis of the plurality of pieces of the machining data acquired;
to extract a plurality of pieces of transfer learning data for performing transfer learning of a first machine learning model that receives, as an input, the data related to the machining conditions in time series for the plurality of steps generated in advance from among the plurality of pieces of the machining data acquired on a basis of the importance calculated and outputs data related to the machining state after execution for the plurality of steps; and
to perform the transfer learning of the first machine learning model by using the plurality of pieces of the transfer learning data extracted, and generate a second machine learning model that receives, as an input, data related to the machining conditions in time series for the plurality of steps and outputs data related to the machining state after execution for the plurality of steps.

2. The transfer learning device according to claim 1, the processing circuitry further performing to acquire a plurality of pieces of preliminary learning data including data used at the time of generating the first machine learning model and related to the machining conditions in time series for the plurality of steps and data related to the machining state after execution for the plurality of steps, wherein
the processing circuitry calculates the importance of each piece of machining data acquired on a basis of the plurality of pieces of the machining data acquired and the plurality of pieces of the preliminary learning data acquired.

3. The transfer learning device according to claim 2, wherein the processing circuitry includes:
to compress the plurality of pieces of the machining data and the plurality of pieces of the preliminary learning data; and
to calculate the importance for each piece of machining data acquired on a basis of the plurality of pieces of the machining data and the plurality of pieces of the preliminary learning data after being compressed.

4. The transfer learning device according to claim 1, the processing circuitry further performing to assign priority to each piece of transfer learning data extracted and select a plurality of pieces of selected transfer learning data from among the plurality of pieces of the transfer learning data on a basis of the priority, wherein the processing circuitry performs the transfer learning of the first machine learning model using the plurality of pieces of the selected transfer learning data selected.

5. The transfer learning device according to claim 4, the processing circuitry further performing:

to evaluate the second machine learning model generated; and to update the priority assigned to each piece of selected transfer learning data on a basis of an evaluation result of the second machine learning model performed, wherein the processing circuitry samples the selected transfer learning data on a basis of the priority updated, and the processing circuitry relearns the second machine learning model on a basis of the selected transfer learning data after the sampling.

6. The transfer learning device according to claim 1, wherein the processing circuitry extracts feature amounts of the plurality of pieces of the transfer learning data, and the processing circuitry performs the transfer learning of the first machine learning model on a basis of the feature amount extracted.

7. A transfer learning method, comprising:

acquiring a plurality of pieces of machining data including data related to time-series machining conditions for causing a machining machine to perform machining for a plurality of steps and data related to a machining state executed by the machining machine for the plurality of steps on a basis of the machining conditions;

calculating an importance with respect to each piece of machining data acquired on a basis of the plurality of pieces of the machining data acquired;

extracting a plurality of pieces of transfer learning data for performing transfer learning of a first machine learning model that receives, as an input, the data related to the machining conditions in time series for the plurality of steps generated in advance from among the plurality of pieces of the machining data acquired on a basis of the importance calculated and outputs data related to the machining state after execution for the plurality of steps; and performing the transfer learning of the first machine learning model by using the plurality of pieces of the transfer learning data extracted, and generating a second machine learning model that receives, as an input, data related to the machining conditions in time series for the plurality of steps and outputs data related to the machining state after execution for the plurality of steps.

* * * * *